(12) United States Patent
Terada et al.

(10) Patent No.: US 7,450,061 B2
(45) Date of Patent: Nov. 11, 2008

(54) RELATIVE POSITION MEASUREMENT SYSTEM USING SATELLITE

(75) Inventors: Yukihiro Terada, Osaka (JP); Keiji Ito, Osaka (JP); Takenori Abe, Osaka (JP); Takashi Fujita, Osaka (JP)

(73) Assignee: Hitachi Zosen Corporation (JP)

( * ) Notice: Subject to any disclaimer, the term of this patent is extended or adjusted under 35 U.S.C. 154(b) by 0 days.

(21) Appl. No.: 11/666,255

(22) PCT Filed: Nov. 10, 2004

(86) PCT No.: PCT/JP2004/016650

§ 371 (c)(1),
(2), (4) Date: Apr. 25, 2007

(87) PCT Pub. No.: WO2006/051582

PCT Pub. Date: May 18, 2006

(65) Prior Publication Data

US 2008/0143592 A1    Jun. 19, 2008

(51) Int. Cl.
*G01S 5/00* (2006.01)
(52) U.S. Cl. .............. 342/357.08; 342/357.17; 181/112
(58) Field of Classification Search ............ 342/357.08, 342/357.17, 357.09; 181/112
See application file for complete search history.

(56) References Cited

U.S. PATENT DOCUMENTS 6,366,854 B1 * 4/2002 Tsuchiya et al. ....... 342/357.06
6,434,509 B1 * 8/2002 Tsuchiya et al. ............ 702/158

FOREIGN PATENT DOCUMENTS

| JP | 11-063984 | 3/1999 |
|----|-----------|--------|
| JP | 2001-027665 | 1/2001 |
| JP | 2001-147263 | 5/2001 |
| JP | 2001-174259 | 6/2001 |
| JP | 2001-281323 | 10/2001 |
| JP | 2004-239841 | 8/2004 |

* cited by examiner

*Primary Examiner*—Thomas H. Tarcza
*Assistant Examiner*—Fred H. Mull
(74) *Attorney, Agent, or Firm*—Kusner & Jaffe

(57) ABSTRACT

A position measurement system for measuring displacement of an observation station viewed from a reference station by receiving radio waves from satellites by these stations, and performing relative position measurement between the stations, having: a short period displacement measurement section for measuring a short period displacement component in each of the stations through independent position measurement; a relative position computing section for performing relative position measurement between said stations; a long period position computing section for inputting a short period displacement component measured by the short period displacement measurement section, a relative position determined by the relative position computing section and an absolute position from the reference station, and determining the absolute position including a long period displacement component by removing the short period displacement component measured by each of the stations; and a radio communication device installed on each of the stations, for transmitting/receiving data to/from another station.

6 Claims, 9 Drawing Sheets

RELATIVE POSITION MEASUREMENT SYSTEM USING SATELLITE

FIELD OF THE INVENTION

The present invention relates to a relative position measurement system for detecting displacement by relative position measurement using radio waves from a plurality of satellites.

BACKGROUND OF THE INVENTION

As a satellite position measurement technology for receiving and analyzing radio waves from a plurality of satellites and detecting a position of a receiver (hereafter called "mobile station" or "observation station"), a single position measurement system for measuring position by a sole mobile station even if the measurement error is large, and a relative position measurement system for accurately determining the position of a mobile station using the correction data from a reference station of which position is known, are available.

In the relative position measurement system, the position measurement accuracy is restricted by the linear distance between receivers, which is the so-called "base length".

For example, in the case of a relative position measurement system which measures position independently using the C/A code of GPS (Global Positioning System) and corrects the measured data using correction data, the limit of the base length, when an error due to the ionosphere and atmosphere is approximately the same for each receiver, is about 100 km or less, and since an error can be offset within this range, an improvement of position measurement accuracy in the relative position measurement system can be expected.

On the other hand, in the case of a system which analyzes the base line using a carrier phase so as to improve the position measurement accuracy, the limit of the base line is short, about 10 km or less, but the position measurement accuracy improves dramatically since a carrier phase, which is sufficiently shorter than the C/A code, is used. [See the new edition of GPS—Precision Positioning System by Satellites (issued by the Japan Survey Association).]

In the case of the relative position measurement system mentioned above, however, the relative position of a mobile station, with respect to the reference station, can be measured accurately, but if the reference station is displaced, the relative position cannot be measured accurately.

For example, if the reference station is shaking due to an earthquake, the reference station is displaced, so that the position of the remote mobile station of which relative position is measured includes the displacement component, so this relative position measurement system cannot perform the measurement of displacement sufficiently when a disaster occurs.

SUMMARY OF THE INVENTION

An advantage of the present invention is a relative position measurement system using satellites that can measure the relative position measurement accurately even if one station is displaced when relative position measurement is performed.

A relative position measurement system using satellites of the present invention is a system for measuring the displacement of an observation station viewed from a reference station by receiving radio waves from satellites by the reference station and observation station, and performing relative position measurement between these stations, comprising: a short period displacement measurement section for measuring a short period displacement component in each of the stations by independent position measurement; a relative position computing section for performing relative position measurement between these stations; a long period position computing section for inputting a short period displacement component measured by the short period displacement measurement section and a relative position determined by the relative position computing section, and determining a relative position including a long period displacement component by removing the short period component from the relative position; and a radio communication device installed on each of the stations, for transmitting/receiving data to/from another station.

In the relative position measurement system, it is preferable that the reference station and the observation station are installed on floating bodies floating on a sea surface.

In the relative position measurement system, it is preferable that the reference station and the observation station are installed on floating bodies floating on a sea surface, and the short period displacement component, measured by the short period displacement measurement section, is a displacement component generated by waves.

In the relative position measurement system, it is preferable that a plurality of the observation stations are provided, and each observation station is disposed so that base lines connecting each observation station and the reference station mutually cross at a predetermined angle.

In the relative position measurement system, it is preferable that the reference station is integrated with and installed on ground, and the short period displacement component, that is measured by the short period displacement measurement section provided in the reference station, is a displacement component generated by an earthquake.

It is preferable that the relative position measurement system further comprises a monitoring facility for performing centralized control for satellite data for the position measurement received by each station and a short period displacement component measured by each station, wherein the monitoring facility performs relative position measurement between the stations, and determines the relative position of the observation station with respect to the reference station by removing the short period displacement component measured by each station.

According to the relative position measurement system, the relative position of the mobile station with respect to the reference station is measured, the short period displacement measurement section is installed in each station, and the short period displacement component is accurately determined through independent position measurement, so even if the reference station is displaced during a short period, for example, the relative position of the mobile station can be accurately measured by removing the short period displacement component.

DETAILED DESCRIPTION OF PREFERRED EMBODIMENTS

Now the relative position measurement system using satellites according to the present invention will be described.

In the present embodiment, a case of applying a real-time kinematic system using GPS (Global Positioning System) satellites as a relative position measurement system, and measuring a position of a floating body, which is moored on a sea surface for detecting a displacement of the sea level (this can be the water level of a lake or similar body of water) as the position measurement target, will be described.

Embodiment

The relative position measurement system using satellites according to the present embodiment will now be described with reference to FIG. 1 to FIG. 6.

Figure 1:
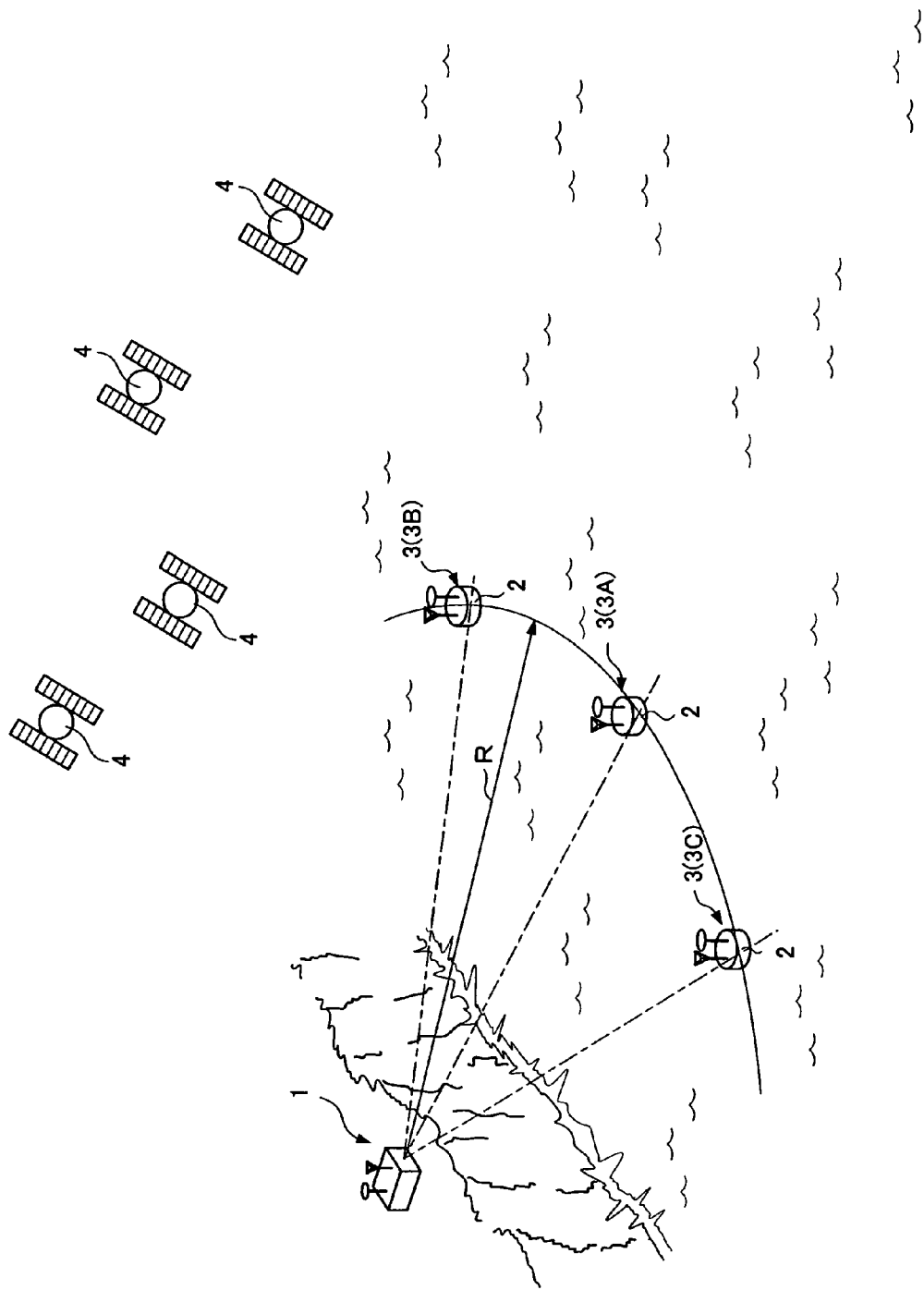
FIG. 1 is a perspective view schematically depicting an overall configuration of a relative position measurement system according to an embodiment of the present invention.

As shown in FIG. 1, this relative position measurement system comprises a reference station 1 fixed on land of which three-dimensional absolute position is known, and a plurality of (three in this case) mobile stations (an example of observation stations) 3 (3A to 3C) installed in a plurality of (three for example) floating bodies (buoys) 2, which are moored on a sea surface in a sea area for detecting tsunami, for example, as displacement of the sea level viewed from the reference station 1, particularly a long period displacement component, and a function, for determining a position of each mobile station 3 with respect to the reference station 1 (called "relative position" or "relative displacement") using a real-time kinematic system (which uses carrier phase, hereafter called "RTK system") receiving radio waves from GPS satellites 4, is provided between the reference station 1 and the mobile stations 3. Three mobile stations 3, for example, are disposed with an appropriate space on a circumference centering around the reference station 1, with a predetermined radius R, so that a tsunami in any direction can be detected. In other words, each mobile station 3 is disposed such that the base lines connecting the reference station 1 and each mobile station 3 cross each other at a predetermined angle.

Figure 2:
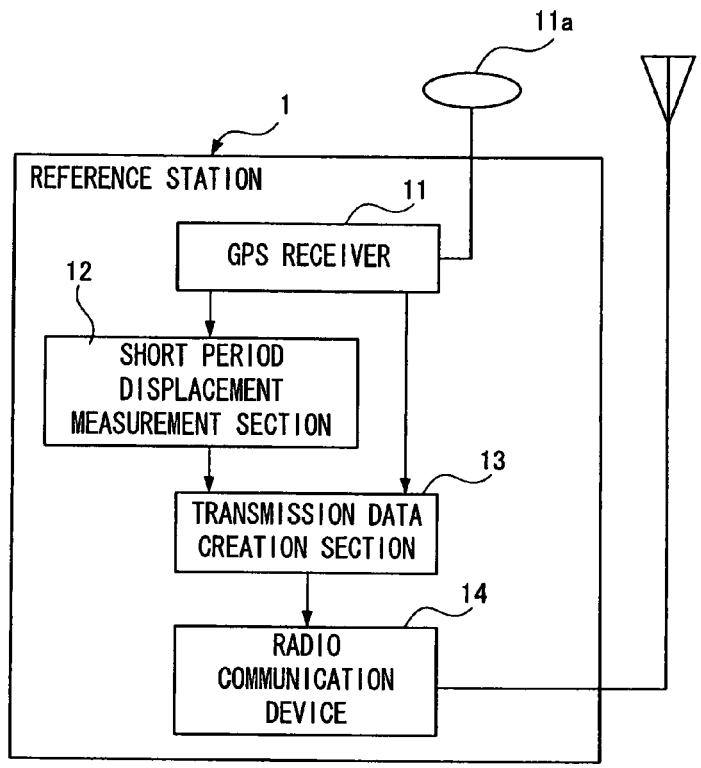
FIG. 2 is a block diagram depicting a general configuration of a reference station in this relative position measurement system.

The reference station 1, as shown in FIG. 2, comprises a GPS receiver (also called a "satellite position measurement device) 11 for receiving radio waves from the GPS satellite 4 via an antenna 11a and measuring the satellite data for position measurement (described later), a short period displacement measurement section 12 for measuring a short period displacement component (e.g. displacement component generated by waves) through independent position measurement at high precision in short periods using satellite data for position measurement, a transmission data creation section 13 for creating transmission data which is the satellite data for position measurement acquired by the GPS receiver 11, which includes the short period displacement component determined by the short period displacement measurement section 12 (also called a "reference station short period displacement component" hereinafter), and a radio communication device (further comprises a transmitter and receiver) 14 which transmits the transmission data from the transmission data creation section 13 to each mobile station 3, and transmits/receives other data.

Figure 3:
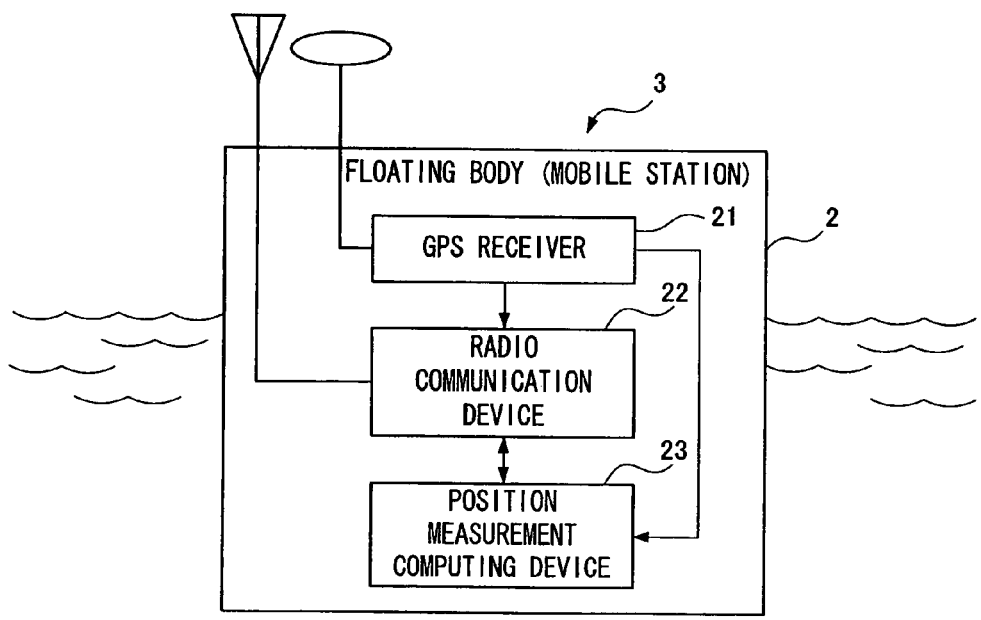
FIG. 3 is a block diagram depicting a general configuration of a mobile station in this relative position measurement system.
Figure 4:
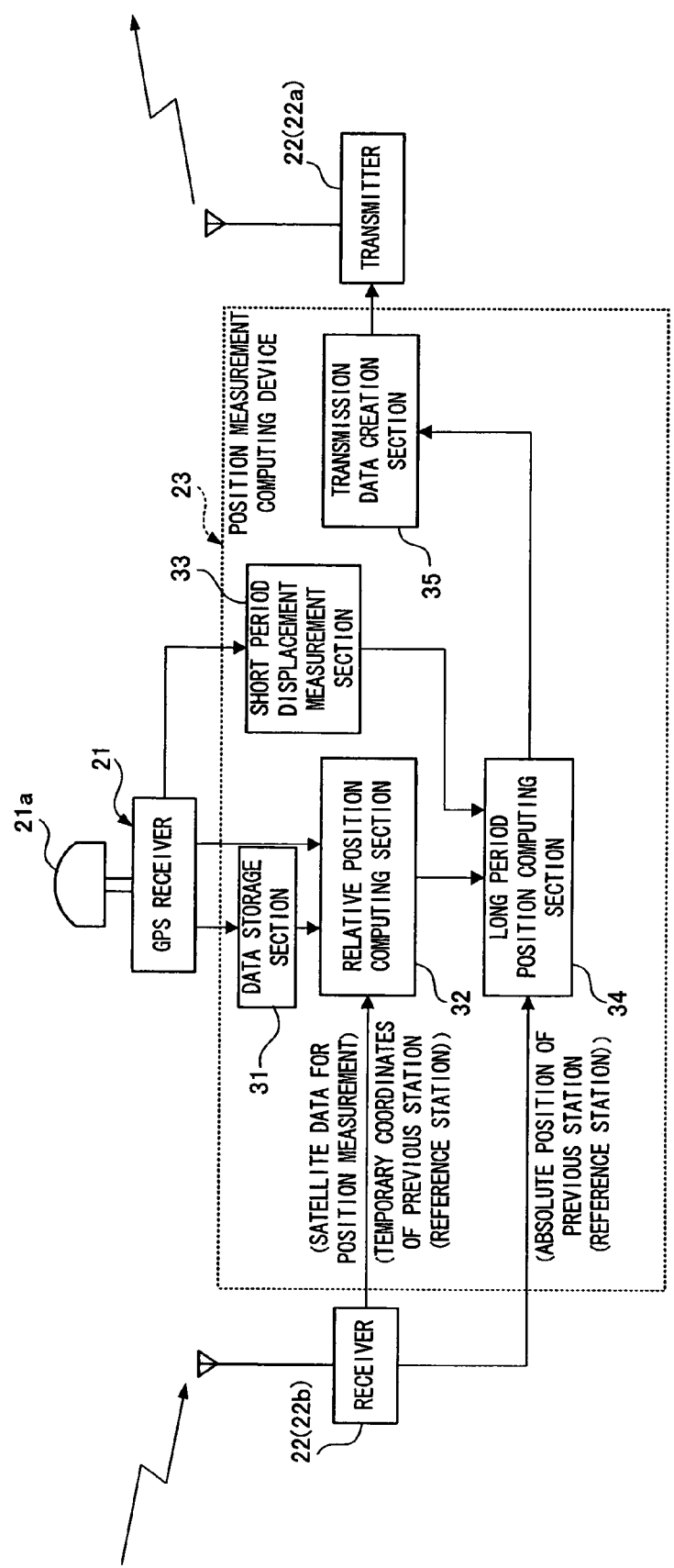
FIG. 4 is a block diagram depicting a general configuration of a position measurement computing device installed in this mobile station.

As shown in FIG. 3, each mobile station 3 comprises a GPS receiver (also called a "satellite position measurement device") 21 for receiving radio waves from the GPS satellite 4 and measuring the satellite data for position measurement, a radio communication device (further comprises a transmitter 22a and receiver 22b as shown in FIG. 4) 22 for transmitting/receiving data with the reference station 1, and a position measurement computing device 23 for receiving data from the reference station 1 and performing relative position measurement based on the data of the same time in the local station using the RTK system, that is, determining the relative position of the local station 3 with respect to the reference station 1.

Now the position measurement computing device 23 installed in the mobile station 3 will be described in detail.

As shown in FIG. 4, this position measurement computing device 23 comprises a data storage section 31 for storing satellite data for position measurement measured by the GPS receiver 21 (e.g. a carrier phase value, distance between the satellite and antenna of the receiver (pseudo-distance), orbit information of the satellite, time series data (GPS time) used for the satellite position measurement system, elevation angle and azimuth of the satellite of which data is being received), a relative position computing section 32 for inputting the satellite data for position measurement obtained in the GPS receiver 21, satellite data for position measurement from the reference station 1, and temporary fixed position (hereafter called "temporary coordinates") of the reference station 1, via the receiver 22b, and computing a relative position with respect to the reference station 1 based on the RTK system, a short period displacement measurement section 33 for measuring the short period displacement component (also called "mobile station short period displacement component" hereinbelow) through independent measurement at high precision using the satellite data for position measurement obtained by the GPS receiver 21, a long period position computing section 34 for inputting the relative position determined by the relative position computing section 32, absolute position from the reference station 1, reference station short period displacement component and mobile station short period displacement component, and computing the long period absolute position including the long period displacement component in the mobile station 3, and a transmission data creation section 35 for creating transmission data for inputting and sending the long period absolute position determined by the long period position computing section 34.

Needless to say, transmission data created by the transmission data creation section 35 is sent to the reference station 1 via the transmitter 22a. Among the satellite data for position measurement, the orbit information, elevation angle and azimuth, for example, are received by two stations which perform relative position measurement respectively, and the elevation angle and azimuth are hardly different between the two stations, so if the data is obtained only by the GPS receiver 11 or 21 of one of the stations, then the data may be sent to the other [station] and used. The data used for relative position measurement is acquired from the data storage section 31 when necessary.

Figure 5:
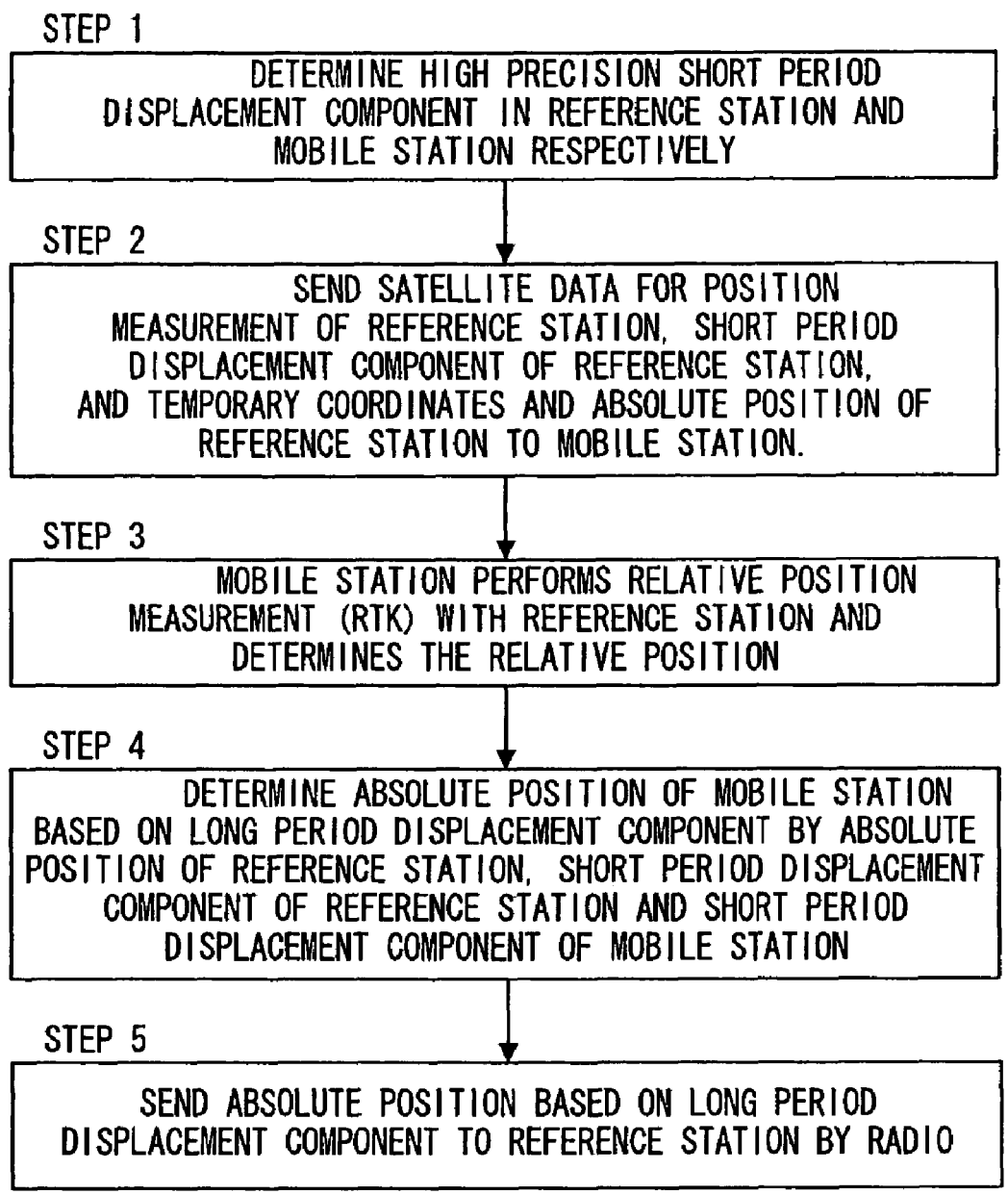
FIG. 5 is a flow chart depicting a relative position measurement method in this relative position measurement system.

Now a method for determining the long period absolute position including the long period displacement component in the relative position measurement system, will be described with reference to the flow chart in FIG. 5.

First the short period displacement measurement sections 12 and 33 of the reference station 1 on land and each mobile station 3 determine the respective short period displacement component at high precision based on the satellite data for position measurement (step 1).

Then the satellite data for position measurement, temporary coordinates and absolute position of the reference station 1, and the reference station short period displacement component are sent to each mobile station 3 on the sea surface (step 2).

Then in the relative position computing section 32 of each mobile station 3, the relative position with respect to the temporary coordinates of the reference station 1 is determined by the relative position measurement with the reference station 1 based on the RTK system (step 3).

Then in the long period position computing section 34 of each mobile station 3, the absolute position of each mobile station 3, including the long period displacement component, is determined by using the absolute position (absolute coordinates) of the reference station 1, reference station short period displacement component and mobile station short period displacement component, that is, by removing the reference station short period displacement component and mobile station short period displacement component from the relative position (relative displacement) between these stations (step 4).

Then the absolute position of each mobile station 3, including the long period displacement component, is sent via radio waves to the reference station 1 (step 5).

In other words, once the absolute position of each mobile station 3, where the short period displacement component is removed, is determined, the position of long period displacement, where the displacement component due to waves on the sea surface is removed, can be measured, and by determining the difference of the measurement position at a previous time and the measurement position at this time, the long period displacement component can be measured.

For example, if the position of each mobile station 3 suddenly changes (displacement from the measured value at previous time is greater than normal), this could refer to the case where a tsunami is generated by an earthquake, and here the reference station 1 itself fluctuates, by measuring this fluctuation as the short period displacement component and removing this short period displacement component, the tsunami can be measured accurately as the long period displacement component.

In order to detect only the displaced position in a long period or only the long period displacement component, like the case of a tsunami, relative positions are used, and the absolute position does not always need to be determined.

Here a method of measuring displacement through independent position measurement, executed in the short period displacement measurement sections 12 and 33 at high precision (also called the "high precision variation detection method", hereafter called the "PVD method"), will be described in brief.

The PVD method was disclosed in a Japanese Patent Publication (Japanese Patent Application Laid-Open No. 2001-147263), and is a method for measuring displacement through an independent position measurement method using GPS satellites at high precision.

With this PVD method, which uses a carrier phase of which wavelength is much shorter than the C/A code, the short period displacement component (displacement quantity) can be measured with precision equivalent to the level of displacement measured by position measurement based on a real-time kinematic method, which is one relative position measurement method that measures using a carrier phase, and a very accurate measurement result can be acquired even if it is an independent position measurement.

Now the general configuration of the short period displacement measurement sections 12 and 33 will be described.

Figure 6:
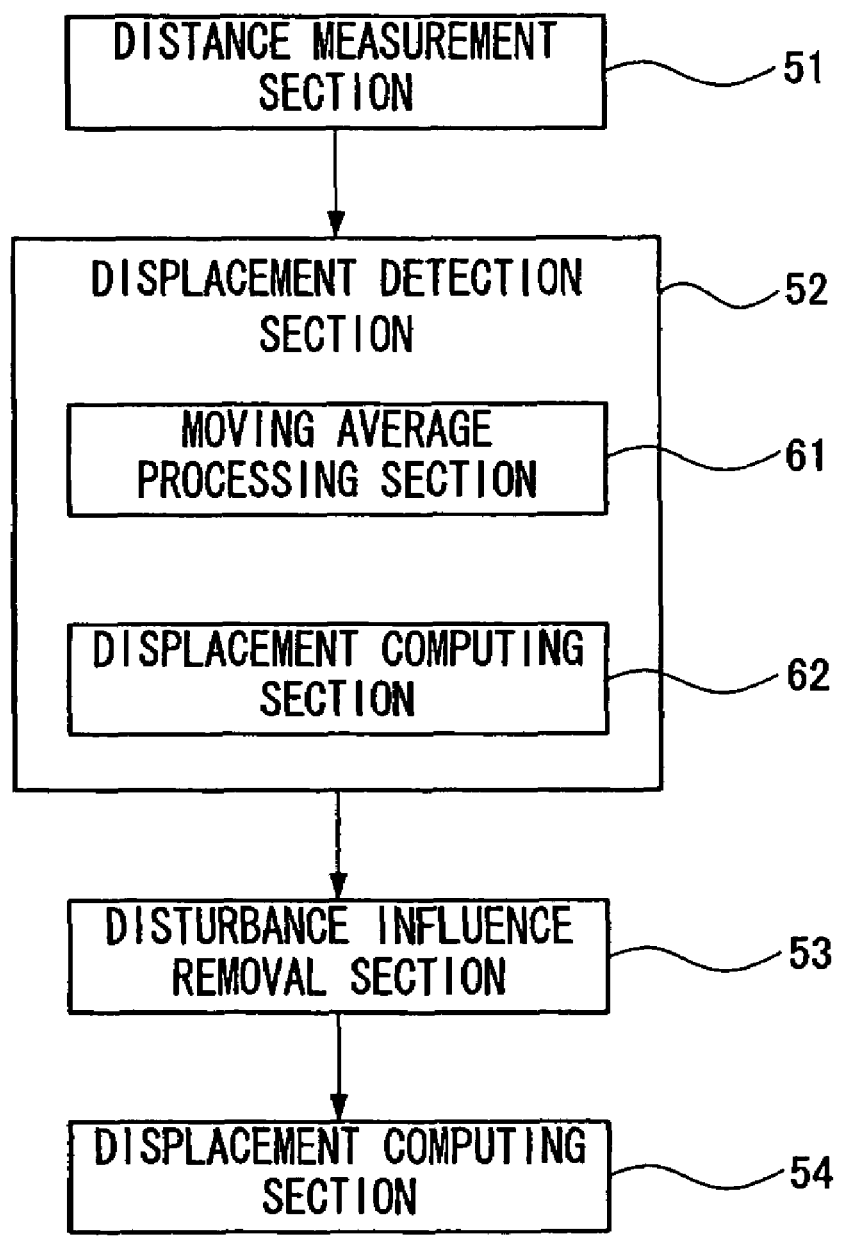
FIG. 6 is a block diagram depicting a general configuration of a short period displacement measurement section installed in each station of this relative position measurement system.

As FIG. 6 shows, the short period displacement measurement sections 12 and 32 are comprised of a distance measurement section 51 which is disposed in the GPS receiver for measuring distance from the GPS satellite, a displacement detection section 52 for determining the displacement of the GPS receiver by subtracting the orbit distance to the satellite orbit or by removing the distance data corresponding to the orbit distance from the distance data measured by the distance measurement section 51, a disturbance influence removal section 53 for inputting the data on the displacement determined by the displacement detection section 52 and removing the influence of such disturbance as wind and waves, and a displacement computing section 54 for inputting the displacement obtained by the disturbance influence removal section 53 [magnitude of the variation vector of the GPS receiver to the satellite (this vector is a projective vector of the true variation vector of actual movement of the GPS receiver to the direction vector with respect to the satellite)], and determining the displacement component in the three-dimensional coordinate directions, that is the x axis, y axis and z axis of the GPS receiver, in other words, determining the displacement of the GPS receiver.

The distance measurement section 51 counts the waves of the carrier of the radio waves from a predetermined satellite which are received by the GPS receiver, and measures the distance (carrier phase) between the predetermined satellite and the GPS receiver (to be precise, this is a distance to the antenna, but a distance to the GPS receiver is used here for this description). (The integer bias used for determining the carrier phase is determined by using four satellites.)

The displacement detection section 52 is further comprised of a moving average processing section 61 for inputting the measurement distance data obtained by the distance measurement section 51 and determining the moving averages of several tens of sampling points, so as to determine the distance data corresponding to the orbit distance of the satellite, and a displacement computing section 62 for determining the displacement of the GPS receiver with respect to the satellite by subtracting the equalized distance data, which is the orbit distance of the satellite, acquired by the moving average processing section 61, from the original measurement distance data.

In the disturbance influence removal section 53, variants due to the influence of wind and waves are removed by allowing the data to pass through the band pass filter, which cuts the frequency band components of the wind and waves.

In the displacement computing section 54, according to each displacement obtained based on the measured distance data from three satellites after disturbance is removed, and according to the azimuth and elevation angle of each satellite, three linear equations, where three-dimensional coordinates of the GPS receiver are unknowns, are created, and the displacement components (X, Y, Z) of the GPS receiver in three-dimensional coordinates are determined by solving the simultaneous linear equations with these three unknowns.

In other words, the short period displacement components are generated by the waves received by the floating body having the GPS receiver, which is a mobile station, and are measured by: the distance measurement section 51 measuring the distance between the GPS receiver and the GPS satellite; the displacement detection section 52 performing moving average processing on the measurement distance data obtained by the distance measurement section 51, removing the distance data corresponding to the distance to the satellite orbit and determining the displacement of the GPS receiver; the disturbance influence removal section 53 removing the noise generated by the wind and waves; the displacement computing section 54 determining at least three linear equations of which the unknowns are the three-dimensional coordinates of the GPS receiver, based on the displacement with respect to the three GPS satellites, and the azimuth and elevation angle of each GPS satellite, and determining the displacement components on the three-dimensional coordinates of the GPS receiver by solving the above mentioned three simultaneous equations.

In this way, the relative position of the mobile station, with respect to the reference station, is measured based on the RTK system, and the short period displacement component is accurately determined through an independent position measurement by disposing the short period displacement measurement section in each station, therefore even if the reference station fluctuates (is displaced) in a short period, the short period displacement component can be removed, and the relative position (or absolute position) of the mobile station can be determined accurately.

Figure 7:
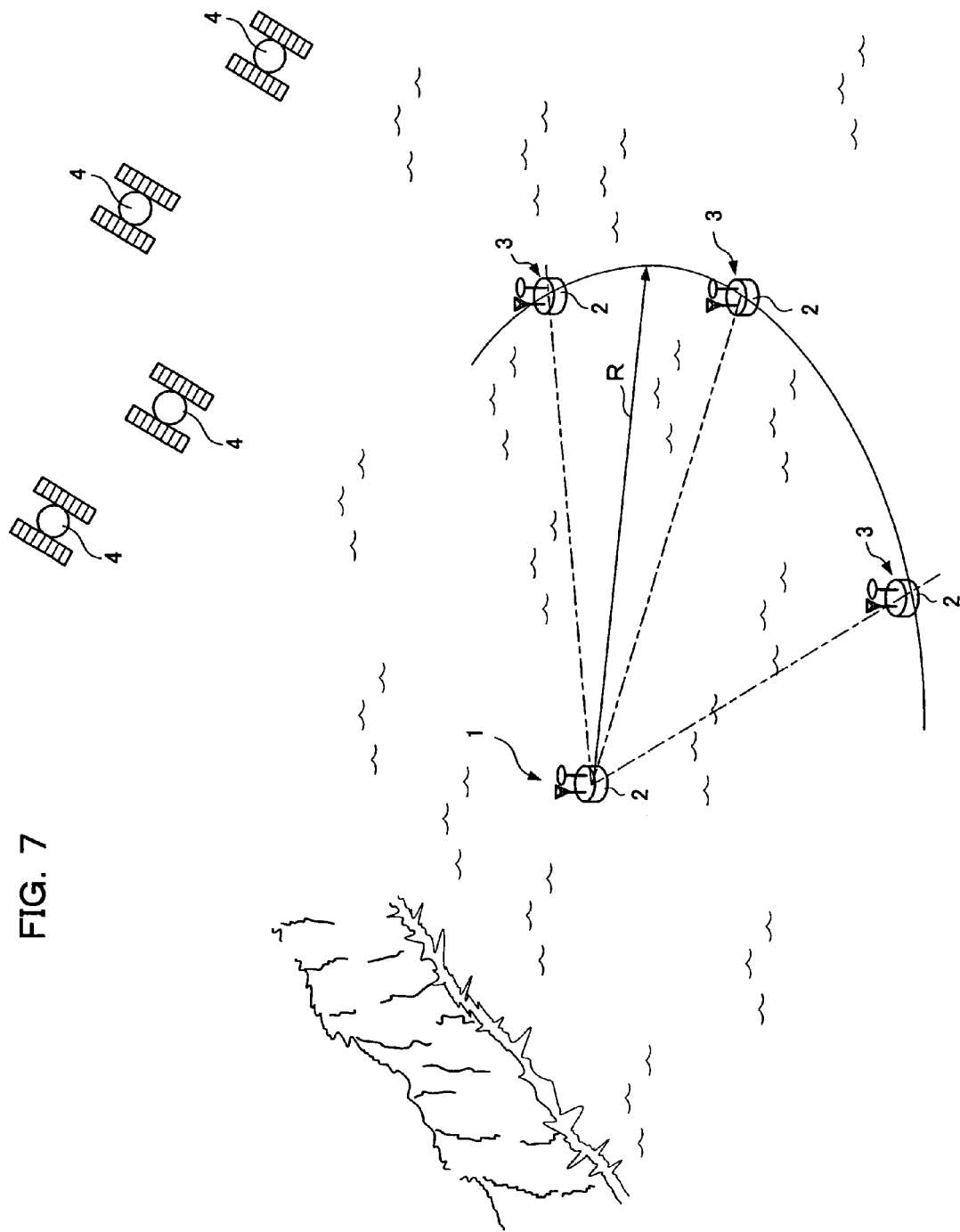
FIG. 7 is a perspective view schematically depicting an entire configuration of this relative position measurement system according to a variant form.
Figure 8:
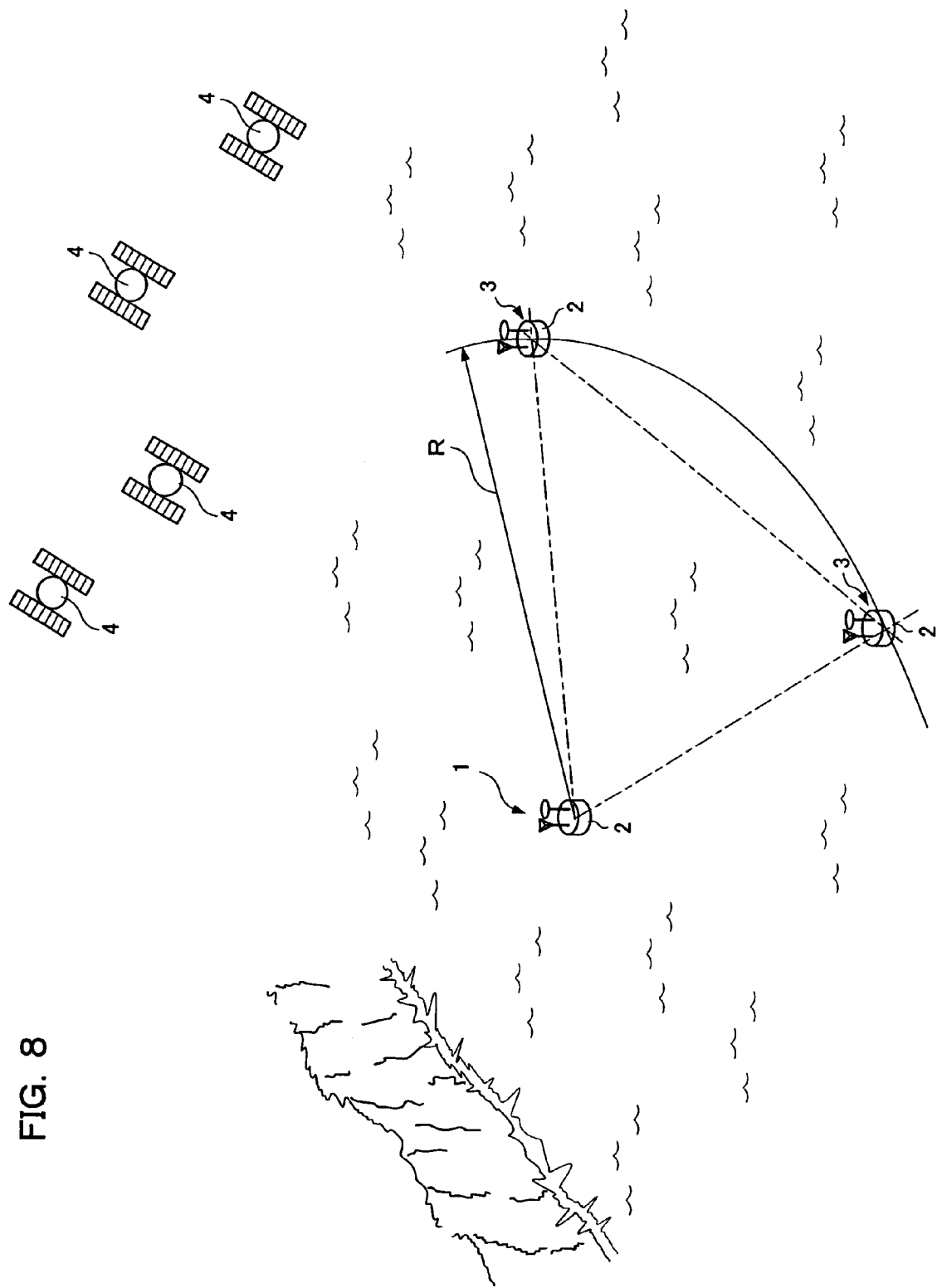
FIG. 8 is a perspective view schematically depicting an entire configuration of this relative position measurement system according to another variant form.

In the present embodiment, the reference station is installed on land, but the reference station 1 may be installed on a floating body 2 on the sea surface, as shown in FIG. 7 and FIG. 8, so that the long period displacement components can be measured between the reference station 1 and the mobile station 3. FIG. 7 shows a case where three mobile stations are installed around the reference station at the center with a predetermined radius R, and FIG. 8 shows a case when two mobile stations are installed around a reference station with a predetermined radius R. (In other words, this is a case where the mobile stations are installed at both ends of the base of an isosceles triangle.) In this case, the reference station has the same configuration as the mobile station, and such measurement data as the long period displacement component is sent from the reference station to a monitoring facility on land, for example.

In this case, the differences from FIG. 1 are that the reference station shown in FIG. 2 is installed on a floating body, and the absolute position is not provided, so in the long period position computing section, the relative position, the reference station short period displacement component and the mobile station short period displacement component are input since the absolute position of the reference station is not provided, and the relative position, including the long period displacement component, is determined.

By disposing the reference station and the mobile stations (observation stations) in this way in a sea area which is distant from land (e.g. a position exceeding the base line limit length of the kinematic system) with a mutual space that is the base line limit length of the kinematic system or less, a tsunami, for example, can be measured accurately offshore, which is distant from land exceeding the base line limit length. (Needless to say, the measurement data obtained at each station is sent to a distant monitoring facility on land via radio.) In other words, the approach of a tsunami can be known in a sea area distant from the coast line, so damage by a tsunami can be minimized.

In the description of the above embodiment, the position measurement computing device is disposed in each mobile station, and the absolute position (or relative position) of the respective mobile stations is determined, but each data may be sent to a monitoring facility (which could also serve as a reference station) on land along with the identification number of the station by a transmitter, so as to be centrally managed.

It is also acceptable that the position measurement computing device is disposed in the reference station and at the same time, the satellite data for position measurement measured by each mobile station is sent to the reference station and stored there, and the absolute position (or relative position) of each mobile station, based on the long period displacement component, is determined by the position measurement computing device of the reference station.

Now the general configuration of the reference station will be described in brief.

Figure 9:
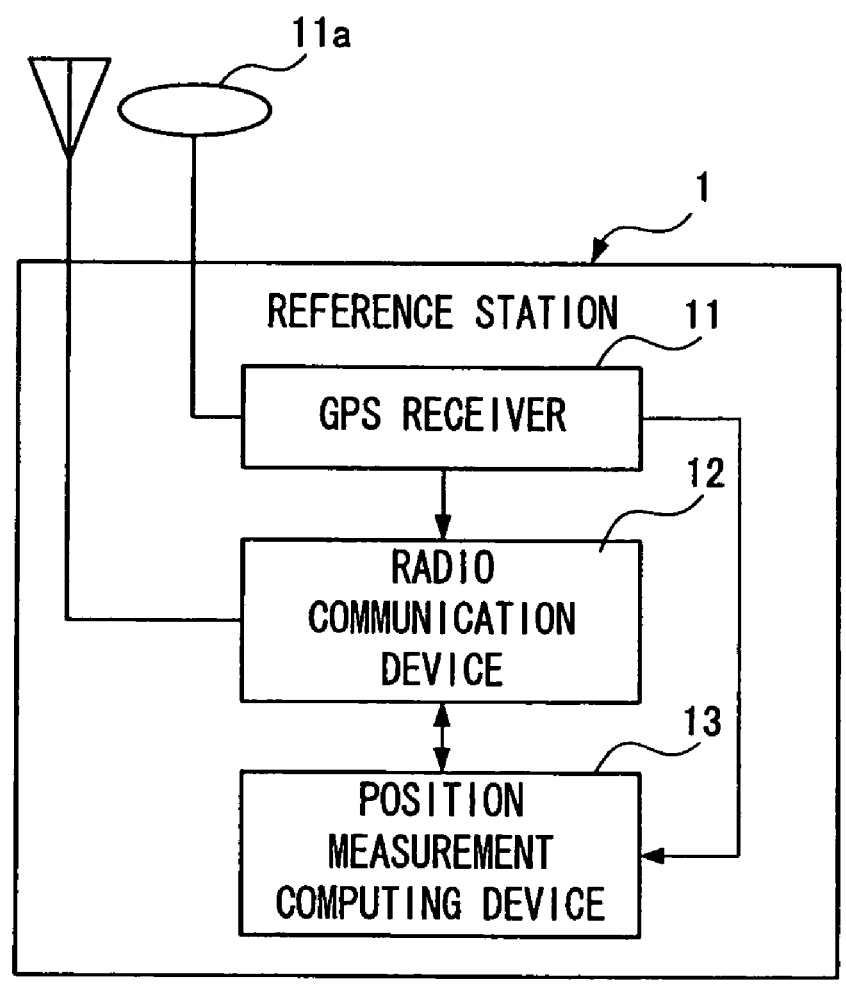
FIG. 9 is a block diagram depicting a general configuration of a reference station in this relative position measurement system according to still another variant form.
Figure 10:
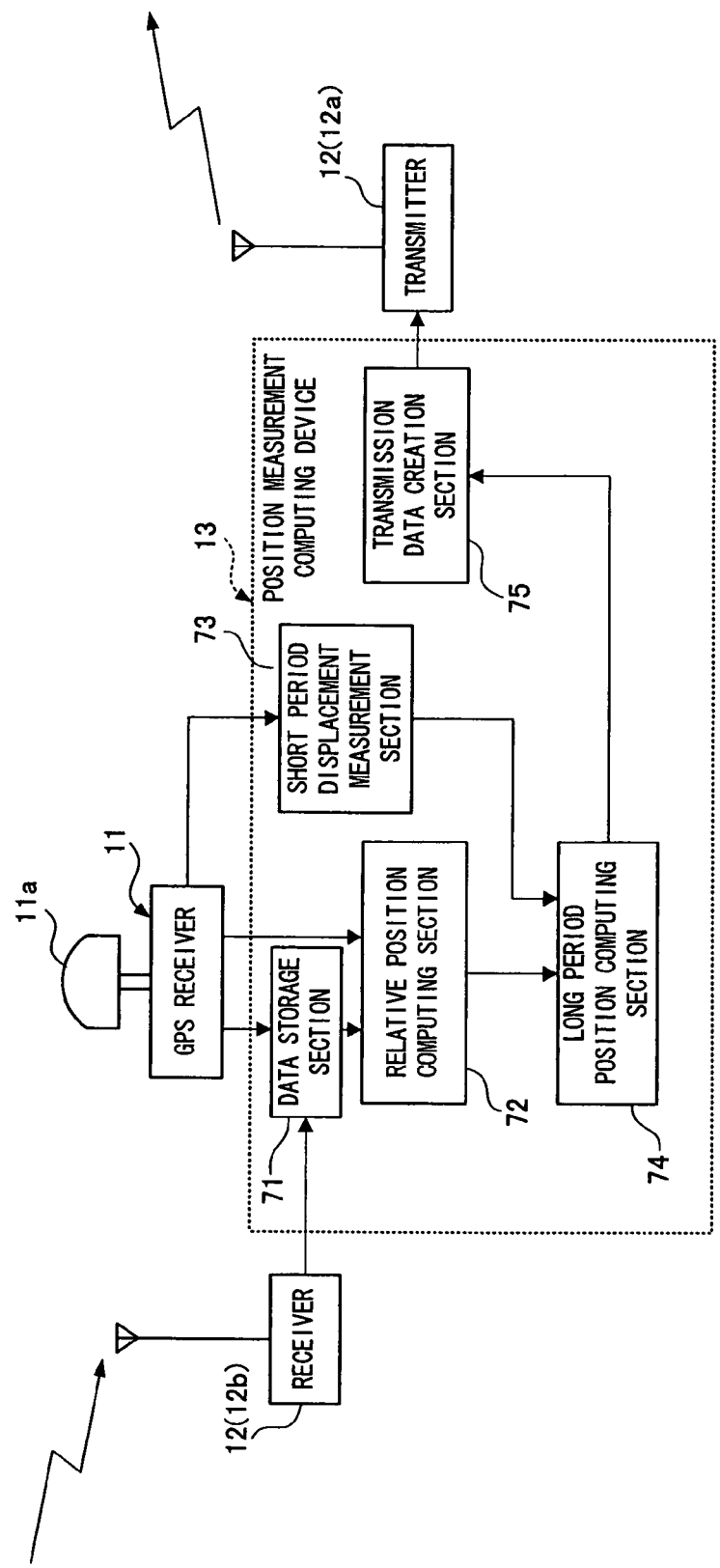
FIG. 10 is a block diagram depicting a general configuration of a position measurement computing device installed in the reference station according to this variant form.

As FIG. 9 shows, the reference station 1 has a position measurement computing device 13, and as FIG. 10 shows, the position measurement computing device 13 is further comprised of at least a data storage section 71 for storing satellite data for position measurement from a GPS receiver 11, a relative position computing section (may also be called position computing section) 72 for inputting satellite data for position measurement stored in this data storage section 71, and computing the relative position of the reference station 1 with respect to the temporary coordinates, a short period displacement measurement section 73 for measuring the short period displacement component through an independent position measurement at high precision, using the satellite data for position measurement acquired by the GPS receiver 11, a long period position computing section 74 for inputting the relative position determined by the relative position computing section 72 and the short period displacement component measured by the short period displacement measurement section 73, and computing a relative position of the reference station 1 including a long period displacement component, and a transmission data creation section 75 for inputting the long period position determined by the long period position computing section 74, and creating transmission data to be transmitted.

In this way, the satellite data for position measurement is sent from each mobile station to the reference station, this data is stored in the reference station, and using this data, the reference position (or absolute position) of each mobile station, including the long period displacement component, is determined by the relative position computing section.

If the reference station measures the relative position, the configuration of the mobile station becomes like FIG. 2. A station which does not perform relative position measurement can have the configuration shown in FIG. 2, and a station which performs relative position measurement has the configuration shown in FIG. 4. As the configuration of a monitoring facility when the monitoring facility performs relative position measurement, the configuration of the mobile station in FIG. 4, from which the GPS receiver 21, short period displacement measurement section 33, transmission data creation section 35 and transmitter 22a are removed, is used.

In the above embodiment, the satellite data for position measurement is stored in the reference station, but this data needs not always be stored and may sequentially be computed if the data transmission timing of each station is set to be shifted.

In the description of the above embodiment, data is transmitted/received between stations via the radio communication device, but if communication by ground waves cannot be performed due to visual limitation, data can be transmitted/received via a communication satellite.

Also in the description of the above embodiment, mobile stations are disposed on the sea surface to measure tsunami, but both the reference station and mobile stations may be disposed on land and used as a seismograph.

Also in the above embodiment, satellite measurement based on GPS was used as an example, but the present invention can also be applied to a satellite position measurement system based on the same principle, or which will be available in the future.

INDUSTRIAL APPLICABILITY

According to the relative position measurement system of the present invention, relative position measurement is performed between a reference station and a mobile station using a real-time kinematic system, and each station has a short period displacement measurement section which can measure the short period displacement component through an independent position measurement at high precision, so if the mobile station is installed on a floating body on a sea surface, for example, a long period displacement component, such as a tsunami when an earthquake occurred, can be measured by the mobile station by removing the displacement component of waves, which is a short period displacement component, from the displacement of the mobile station, and therefore damage caused by a tsunami can be minimized. In some cases, this relative position measurement system can also be used as a seismograph.

The invention claimed is:

1. A relative position measurement system for measuring displacement of an observation station viewed from a reference station by receiving radio waves from satellites by the reference station and the observation station and performing relative position measurement between said stations, comprising:
   a short period displacement measurement section for measuring a short period displacement component in each of said stations through independent position measurement;
   a relative position computing section for performing relative position measurement between said stations;
   a long period position computing section for inputting a short period displacement component measured by said short period displacement measurement section and a relative position determined by said relative position computing section, and determining a relative position including a long period displacement component by removing the short period displacement component from the relative position; and
   a radio communication device installed in each of said stations, for transmitting/receiving data to/from another station.

2. The relative position measurement system using satellites according to claim 1, wherein the reference station and the observation station are installed on floating bodies floating on a sea surface.

3. The relative position measurement system using satellites according to claim 1, wherein the reference station and the observation station are installed on floating bodies floating on a sea surface, and the short period displacement component measured by the displacement measurement section is a displacement component generated by waves.

4. The relative position measurement system using satellites according to claim 3, wherein a plurality of the observation stations are provided, and each observation station is disposed so that base lines connecting each observation station and the reference station mutually cross at a predetermined angle.

5. The relative position measurement system using satellites according to claim 1, wherein the reference station is integrated with and installed on ground, and the short period displacement component that is measured by the displacement measurement section provided in said reference station is a displacement component generated by an earthquake.

6. The relative position measurement system using satellites according to claim 1, further comprising a monitoring facility for performing centralized control for satellite data for position measurement received by each station and a short period displacement component measured by each station, wherein
said monitoring facility performs relative position measurement between said stations, and determines the relative position of the observation station with respect to the reference station by removing the short period displacement component measured by each station.

* * * * *